O. ROUSSEAU.
WINDING DRUM FOR MOTOR VEHICLE WHEELS.
APPLICATION FILED MAY 24, 1919.
1,325,658.
Patented Dec. 23, 1919.
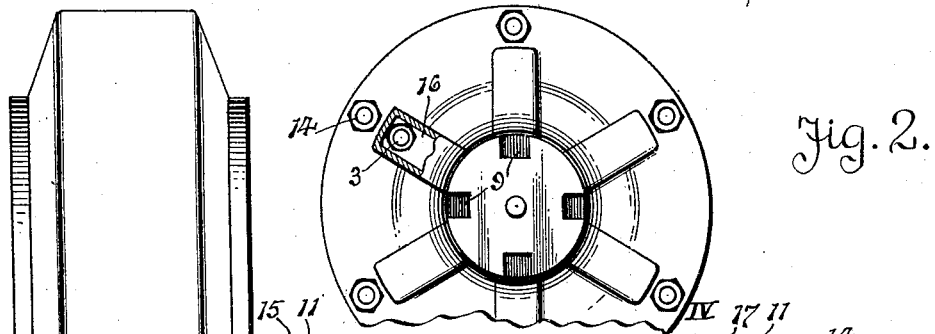
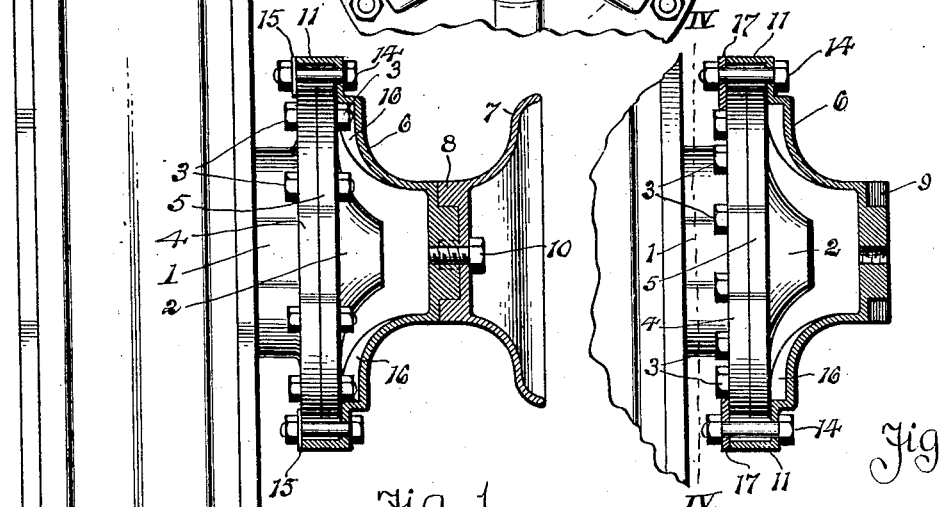
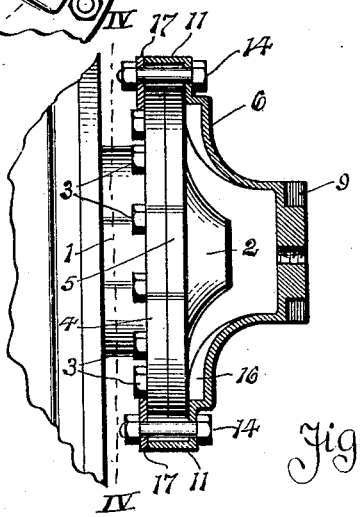
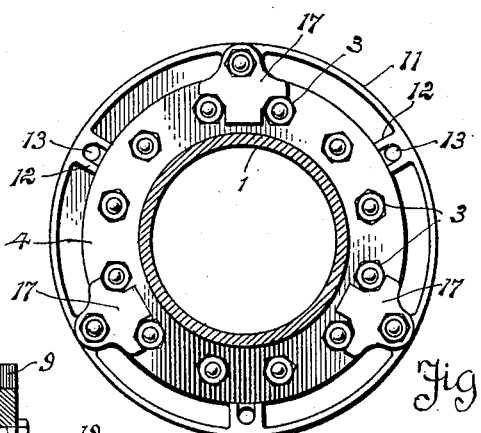
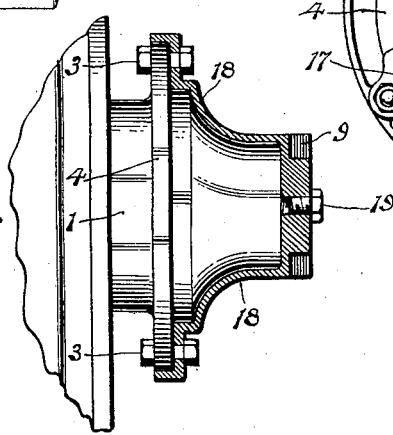
Inventor
Onesime Rousseau,
By
Attorneys

UNITED STATES PATENT OFFICE.

ONESIME ROUSSEAU, OF DETROIT, MICHIGAN.

WINDING-DRUM FOR MOTOR-VEHICLE WHEELS.

1,325,658.     Specification of Letters Patent.     Patented Dec. 23, 1919.

Application filed May 24, 1919. Serial No. 299,434.

*To all whom it may concern:*

Be it known that I, ONESIME ROUSSEAU, a citizen of the United States of America, residing at Detroit, in the county of Wayne and State of Michigan, have invented certain new and useful Improvements in Winding-Drums for Motor-Vehicle Wheels, of which the following is a specification, reference being had therein to the accompanying drawings.

This invention relates to a winding drum attachment for the hubs of motor vehicles and its object is to provide a simple and convenient device which may be readily attached to the hub of a vehicle as ordinarily constructed and may be readily detached therefrom or a portion of the drum left in place upon the hub to be ready for instant use.

A further object of the invention is to provide a construction wherein the drum is provided with ready means for engaging the hub to form a driving connection therewith, and further, to provide certain new and useful features in the construction and arrangement of parts.

With these and other ends in view, the invention consists in the matters hereinafter set forth and more particularly pointed out in the appended claims, reference being had to the accompanying drawing in which Figure 1 is an elevation of a vehicle wheel and hub with a winding drum embodying the invention in place thereon and shown in vertical section;

Fig. 2 is an end elevation of the inner member of the drum, the outer member being detached;

Fig. 3 is an elevation of the wheel hub with the inner member of a drum in place thereon and showing a modified construction of the drive means between the drum member and the hub;

Fig. 4 is an elevation of the drum member in place upon the hub which is shown in section substantially upon the line IV of Fig. 3, and Fig. 5 is a side elevation of a wheel hub with a drum member secured in place thereon and forming a cap for the hub.

The construction shown in the drawings is particularly adapted for use upon the hubs of motor trucks in which the hub 1 is usually provided with a cap 2 which is secured in place thereon by bolts 3 passing through outstanding flanges 4 and 5 on the hub and hub cap respectively.

The winding pulley embodying the invention comprises an inner member 6 and an outer member 7, these members being secured together by providing lugs 8 on one member to engage corresponding recesses 9 in the other, the winding drum being divided transversely substantially at the center of its winding groove. The outer member 7 is held in interlocked position upon the inner member by means of a suitable stud or bolt 10.

The inner member 6 of the drum is formed with a peripheral flange 11 extending over the flanges 4 and 5 of the hub and hub cap, this flange 11 being spaced from the hub flanges by means of inwardly extending lugs 12 on the flange 11 which lugs are formed with openings 13 to receive bolts 14, the heads of which engage the outer wall of the pulley and the nuts of which engage notches 15 placed between the nuts and the edge of the flange 11 and overlying the flange 4 of the wheel hub. By drawing up on these bolts, the drum is securely fastened to the wheel hub and to provide a driving engagement of the drum member with the wheel hub, said member is formed with recesses 16 in its inner face to receive the heads of the bolts 3 which secure the hub cap to the hub. Relative rotation between the member 6 and the hub is therefore prevented by the engagement of the heads of the bolts 3 with the recesses in the drum member. Where the hub cap 2 is secured in place by bolts having no heads upon their outer ends, as shown in Fig. 3, then driving engagement between the drum member 6 and the hub is secured through plates 17 attached to the drum member by bolts 14 and extending inwardly at the inner side of the hub flange 4 between adjacent bolts 3, said plate being formed to engage the nuts or heads on the inner ends of these bolts. The plates 17 thus take the place of washers 15 for holding the drum member in place upon the hub and also form the driving engagement with the hub by their engagement with the heads of the bolts 3.

In Fig. 5 the hub cap 2 is shown as removed from the hub and this hub cap is replaced by an inner drum member 18 which is securely and permanently bolted to the hub flange 4 by the bolts 3 usually employed for securing the hub clamp in place. This drum member becomes a permanent though detachable part of the wheel hub and the outer end thereof is formed with the notches 9 for the engagement therewith of the outer member 7 of the drum. The screw-threaded opening for the bolt 10 is closed when the outer drum member 7 is removed, by a suitable cap screw 19 or the same bolt 10 may be used for this purpose.

By means of this simple winding drum attachment, the power of the motor vehicle may be employed in extricating the vehicle from the mud, by simply anchoring one end of a cable and making the other end fast to the drum so that upon the application of power and the driving of the wheel, the cable will be wound upon the drum. This drum is preferably made in two parts so that the inner part or member may be left in place upon the wheel hub ready for use at all times and the cable may be wound upon the outer member of the drum and conveniently stored in the vehicle. A very simple device which is cheap to manufacture and which may be substituted for the hub cap, is thus provided and a very secure driving engagement between the drum and the hub is had which driving engagement is such that the device may be applied to the hub of any motor truck as ordinarily constructed.

Having thus fully described my invention, what I claim is:

1. A device of the character described, comprising an outer drum member and an inner drum member, means for detachably securing the drum members together in endwise engagement, a peripheral flange on the inner drum member adapted to encircle a flange on a hub, and means for securing the inner drum member in place upon said hub.

2. A device of the character described, comprising an outer drum member and an inner drum member, means for detachably securing the drum members together in endwise engagement, a peripheral flange on the inner hub member adapted to embrace the flange of a wheel hub and having inwardly extending lugs to space said peripheral flange from the hub flange, said lugs being provided with openings, bolts extending through the openings and means on the inner ends of the bolts for engaging the peripheral flange and a hub flange.

3. A device of the character described, comprising an outer drum member and an inner drum member, means for detachably securing the drum members together in endwise engagement, said inner drum member being provided with recesses to receive the heads of the bolts on a hub and form a driving connection between said member and hub, and means for securing the inner drum member to a hub.

4. A device of the character described, comprising an outer drum member and an inner drum member, means for detachably securing the drum members together in endwise engagement, said inner drum member being formed with recesses to receive the heads of the bolts on a hub, a peripheral flange on the inner drum member to extend over a flange on a wheel hub, bolts extending through the drum member outside the wheel hub flange, and means on the inner ends of said bolts for engaging the inner side of the hub flange.

In testimony whereof I affix my signature in the presence of two witnesses.

ONESIME ROUSSEAU.

Witnesses:
 LEWIS E. FLANDERS,
 ANNA M. DORR.